(12) United States Patent
Laas et al.

(10) Patent No.: US 9,353,210 B2
(45) Date of Patent: May 31, 2016

(54) SILANE FUNCTIONAL BINDER WITH THIOURETHANE STRUCTURE

(71) Applicant: Bayer MaterialScience AG, Monheim Am Rhein (DE)

(72) Inventors: Hans-Josef Laas, Odenthal (DE); Berta Vega Sanchez, Köln (DE); Lothar Kahl, Bergisch Gladbach (DE)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 14/425,206

(22) PCT Filed: Aug. 28, 2013

(86) PCT No.: PCT/EP2013/067840
§ 371 (c)(1),
(2) Date: Mar. 2, 2015

(87) PCT Pub. No.: WO2014/037265
PCT Pub. Date: Mar. 13, 2014

(65) Prior Publication Data
US 2015/0259461 A1    Sep. 17, 2015

(30) Foreign Application Priority Data

Sep. 4, 2012 (EP) .................................. 12182886

(51) Int. Cl.

| | | |
|---|---|---|
| *C08G 18/48* | (2006.01) | |
| *C08G 18/87* | (2006.01) | |
| *C08G 18/38* | (2006.01) | |
| *C08G 65/336* | (2006.01) | |
| *C08G 18/73* | (2006.01) | |
| *C08G 18/75* | (2006.01) | |
| *C08G 18/80* | (2006.01) | |
| *C09D 175/04* | (2006.01) | |
| *C08G 18/28* | (2006.01) | |
| *C08G 18/32* | (2006.01) | |
| *C08G 18/42* | (2006.01) | |
| *C08G 18/62* | (2006.01) | |
| *C09D 175/06* | (2006.01) | |
| *C09D 175/08* | (2006.01) | |
| *C09D 175/14* | (2006.01) | |
| *C09J 175/06* | (2006.01) | |
| *C09J 175/08* | (2006.01) | |
| *C09J 175/14* | (2006.01) | |

(52) U.S. Cl.
CPC .......... *C08G 18/3893* (2013.01); *C08G 18/289* (2013.01); *C08G 18/3206* (2013.01); *C08G 18/4211* (2013.01); *C08G 18/4238* (2013.01); *C08G 18/4825* (2013.01); *C08G 18/6229* (2013.01); *C08G 18/73* (2013.01); *C08G 18/755* (2013.01); *C08G 18/758* (2013.01); *C08G 18/809* (2013.01); *C08G 65/336* (2013.01); *C09D 175/04* (2013.01); *C09D 175/06* (2013.01); *C09D 175/08* (2013.01); *C09D 175/14* (2013.01); *C09J 175/06* (2013.01); *C09J 175/08* (2013.01); *C09J 175/14* (2013.01)

(58) Field of Classification Search
None
See application file for complete search history.

(56) References Cited

U.S. PATENT DOCUMENTS

| | | |
|---|---|---|
| 3,494,951 A | 2/1970 | Berger |
| 3,640,967 A | 2/1972 | König et al. |
| 4,499,150 A | 2/1985 | Dowbenko et al. |

(Continued)

FOREIGN PATENT DOCUMENTS

| | | |
|---|---|---|
| DE | 1 770 245 B2 | 9/1975 |
| DE | 2540080 A1 | 3/1976 |

(Continued)

OTHER PUBLICATIONS

International Search Report for PCT/EP2013/067840 mailed Nov. 29, 2013.

*Primary Examiner* — Marc Zimmer
(74) *Attorney, Agent, or Firm* — Drinker Biddle & Reath LLP

(57) ABSTRACT

The invention relates to a method for producing polyurethanes containing silane groups by reacting at least A) a composition containing a) one or more compounds containing isocyanate and silane groups of general formula (I) and b) <=1 percent by weight, relative to the total mass of composition A), one or more monomeric diisocyanates with aliphatically, cycloaliphatically, araliphatically and/or aromatically bonded isocyanate groups of general formula (II), where R1, R2 and R3 are the same or different radicals and respectively indicate a saturated or unsaturated, linear or branched, aliphatic or cycloaliphatic or an optionally substituted aromatic or araliphatic radical with up to 18 carbon atoms, which can contain optionally up to 3 heteroatoms from the series oxygen, sulphur, nitrogen, X is a linear or branched organic radical with at least 2 carbon atoms and Y is a linear or branched, aliphatic or cycloaliphatic radical with 4 to 18 carbon atoms or an optionally substituted aromatic or araliphatic radical with 6 to 18 carbon atoms, with B) an at least difunctional polyol with a numerically average molecular weight Mn of 62 to 22000 g/mol, preferably 90 to 12000 g/mol, while maintaining an equivalent ratio of isocyanate groups to hydroxyl groups of 0.7:1 to 1.2:1. The invention further relates to the products which can be obtained using the method according to the invention. Moreover, the invention relates to the use of the products which can be obtained using the method according to the invention as starting components in the production of cross-linkable binders, varnish, and raw materials for sealants or adhesives.

15 Claims, No Drawings

(56) References Cited

U.S. PATENT DOCUMENTS

| | | | |
|---|---|---|---|
| 4,507,447 A | 3/1985 | Yamazaki et al. | |
| 5,364,955 A | 11/1994 | Zwiener et al. | |
| 5,756,751 A | 5/1998 | Schmalstieg et al. | |
| 6,515,096 B2 | 2/2003 | Windmueller et al. | |
| 6,730,768 B2 | 5/2004 | Heidbreder et al. | |
| 7,635,743 B2 * | 12/2009 | Wintermantel | C08G 18/12 528/28 |
| 7,879,407 B2 | 2/2011 | Poppeq et al. | |
| 8,263,226 B2 * | 9/2012 | Rosenau | C08G 18/12 156/329 |
| 8,658,752 B2 | 2/2014 | Groenewolt et al. | |
| 2007/0155882 A1 * | 7/2007 | Yamaguchi | C08F 290/068 524/409 |
| 2011/0082254 A1 | 4/2011 | Sepeur et al. | |
| 2012/0245241 A1 | 9/2012 | Peiffer et al. | |

FOREIGN PATENT DOCUMENTS

| | | |
|---|---|---|
| DE | 2622951 A1 | 11/1977 |
| DE | 102008030304 A1 | 12/2009 |
| EP | 0070475 A2 | 1/1983 |
| EP | 0202491 A2 | 11/1986 |
| EP | 0372561 A2 | 6/1990 |
| EP | 0596360 A1 | 5/1994 |
| EP | 0 649 850 A1 | 4/1995 |
| EP | 0659792 A2 | 6/1995 |
| EP | 0689556 A1 | 1/1996 |
| EP | 0807649 A1 | 11/1997 |
| EP | 0937110 A1 | 8/1999 |
| EP | 0978523 A1 | 2/2000 |
| EP | 1136495 A2 | 9/2001 |
| EP | 2046861 A1 | 4/2009 |
| GB | 1526953 A | 10/1978 |
| GB | 1534258 A | 11/1978 |
| JP | S60233133 A | 11/1985 |
| JP | 61047774 A | 3/1986 |
| JP | S61218631 A | 9/1986 |
| WO | WO-2006/042658 A1 | 4/2006 |
| WO | WO 2007/074143 * | 7/2007 |
| WO | WO-2009/115079 A1 | 9/2009 |
| WO | WO-2011/069966 A1 | 6/2011 |
| WO | WO-2011/124710 A1 | 10/2011 |

\* cited by examiner

SILANE FUNCTIONAL BINDER WITH THIOURETHANE STRUCTURE

CROSS-REFERENCE TO RELATED APPLICATIONS

This application is a national stage application (under 35 U.S.C. §371) of PCT/EP2013/067840, filed Aug. 28, 2013, which claims benefit of European Application No. 12182886.7, filed Sep. 4, 2012, both of which are incorporated herein by reference in their entirety.

The invention relates to a process for preparing polyurethanes containing silane groups, to the polyurethanes containing silane groups obtainable by this process, to the use thereof as binders in crosslinkable raw materials for varnishes, sealants or adhesives, and to the crosslinkable binders containing the inventive structures.

Silane-functional polyurethanes have long been known and have been described many times as binders for adhesives, sealants or coatings.

Polyurethanes bearing silane groups can be prepared in various ways, for example by reacting polyisocyanates or isocyanate-functional prepolymers with silane compounds reactive toward isocyanate groups, for example secondary aminoalkylsilanes or mercaptoalkylsilanes.

One method, which is frequently preferred since it leads to silane-functional polyurethanes of particularly low viscosity, involves reacting hydroxy-functional compounds, for example polyether polyols, polyurethane polyols or polyester polyols, with isocyanatoorganosilanes, for example the isocyanatoalkylalkoxysilanes described in U.S. Pat. No. 3,494, 951 or EP-A 0 649 850. Using such isocyanatoalkylsilanes, it is possible, for example, starting from hydroxy-functional polyurethane prepolymers or polyether polyols, to prepare low-viscosity silane-terminated polyurethane prepolymers which can serve as binders for moisture-crosslinking adhesives and sealants (see, for example, EP-A 0 070 475 and EP-A 0 372 561).

The reaction of isocyanatopropyltrimethoxysilane or isocyanatopropyltriethoxysilane with polyols, for example polyacrylate polyols and/or simple polyhydric alcohols, according to the teaching of WO 2009/115079, leads to polyurethanes containing alkoxysilane groups, which can be cured thermally in the presence of suitable catalysts, even with exclusion of water, and enable, for example, the formulation of automotive paints of very high scratch resistance.

However, the isocyanatoalkylalkoxysilanes used with preference for silane modification of polyols, such as isocyanatopropyltrimethoxysilane in particular, are obtainable only with difficulty on the industrial scale. By the known synthesis routes, they are obtained in varying quality and with inadequate storage stability, and are correspondingly costly. There have therefore also already been proposals of alternative isocyanatosilanes for preparation of silane-functional polyurethanes. EP-A 1 136 495 describes, for example, a process for preparing low-monomer 1:1 mono adducts from specific secondary aminoalkylalkoxysilanes and diisocyanates, which are suitable as units for controlled modification of polymers.

In this process, the co-reactants are reacted with one another using a large molar excess of isocyanate and, thereafter, the unconverted monomeric diisocyanates are removed by distillation. The secondary aminosilanes used are the aspartic esters which are known from EP-A 0 596 360 and are obtainable by reacting dialkyl maleates with primary aminosilanes, and the adducts thereof with isocyanates are said to have increased storage stability compared to that of simple N-alkylaminosilanes.

As shown by in-house studies, the urea structures formed in the reaction of the silane-functional aspartic esters with isocyanates are indeed stable, while simple N-alkylaminosilanes, with respect to isocyanate groups, act like standard blocking agents which are released again at elevated temperature. Because of this blocking agent character, during the thin-film distillation of reaction mixtures of diisocyanates and simple N-alkylaminosilanes, the result of thermal urea cleavage and subsequent recombination, given that the diisocyanate monomer has already been partly distilled off, is that not only the desired isocyanatosilane (1:1 mono adduct) but always also very high proportions of disilylated diisocyanate (2:1 bis adduct) are formed, even if a very high isocyanate excess was initially chosen for the reaction. Low-monomer isocyanatosilanes based on simple N-alkylaminosilanes are unsuitable for preparation of silane-functional polyurethanes for this reason.

But even EP-A 1 136 495 merely refers in a sweeping manner to possible use of the claimed 1:1 adducts of diisocyanate and aspartic esters for modification of polymers. There are no specific descriptions of silane-functional polyurethanes in this publication. The reason for this is that the process likewise has a serious disadvantage.

As known from EP-A 0 807 649, adducts of isocyanates onto aspartic esters containing alkoxysilane groups react even at comparatively mild temperatures of 50-160° C., with release of the alcohol from one of the ester groups and subsequent cyclization, to give hydantoin derivatives. This reaction inevitably also takes place in the process of EP-A 1 136 495 because of thermal stress during the thin-film distillation. The monoalcohol eliminated reacts partly with the desired target molecule, the isocyanatosilane, with urethanization and loss of the NCO functionality, and partly with excess monomeric diisocyanate. Depending on the distillation conditions chosen, isocyanatosilanes contaminated by varying proportions of secondary components, for example non-isocyanate-functional silanes, are obtained, and these are therefore unusable as units for controlled modification of polyols.

In addition, the use of diisocyanate/mercaptosilane adducts is already known in principle for modification of polymers.

DE-A 2540080 describes the use of different isocyanatosilanes, including adducts of polyisocyanates and silanes that are reactive toward isocyanate groups, for example including mercaptosilanes, in a ratio of equivalents of isocyanate groups to groups that are reactive toward isocyanates of at least 2:1, in specific adhesive compositions. There is no description of a reaction of the adducts with polymers bearing NCO-reactive groups.

JP-A 60233133 gives a specific description, for example, of the equimolar reaction of hexamethylene diisocyanate (HDI) with 3-mercaptopropyltrimethoxysilane. The reaction product which, as well as the 1:1 adduct, because of the statistical course of the reaction, contains considerable proportions of monomeric and doubly converted diisocyanate is used as such without further purification or monomer removal for modification of a polyamide containing amino groups. However, the high proportion of diisocyanate leads, in the reaction with polymers, to chain extension or premature crosslinking, combined with a drastic increase in viscosity. According to JP-A 61047774, these adducts are suitable makeup components for hotmelt adhesives.

JP-A 61218631 describes the use of reaction products of diisocyanates and mercaptosilanes in a molar ratio of 1:1 for modification of polyester polyols in the production of hotmelt adhesives. Since unreacted monomeric diisocyanate is not removed here either, the reaction with polymers likewise results in a drastic increase in viscosity.

It was therefore an object of the present invention to provide a process for preparing low-viscosity silane-modified polyurethanes, which is based on isocyanatosilanes obtainable readily and reproducibly even on the industrial scale. The products obtainable by this process should be suitable for all the fields of use of silane-modified polyurethanes, especially as binders for moisture-crosslinking thermally curable adhesives, sealants or coatings.

The object is achieved in accordance with the invention by a process for preparing polyurethanes containing silane groups, by reacting at least
A) a composition containing
 a) compounds of the general formula (I) containing one or more isocyanate and silane groups

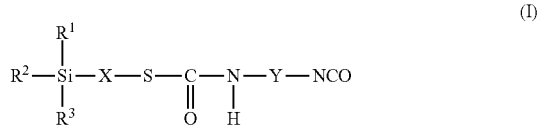

(I)

and
 b) ≤1% by weight, based on the total mass of composition A), of one or more monomeric diisocyanates having aliphatically, cycloaliphatically, araliphatically and/or aromatically bonded isocyanate groups of the general formula (II)

OCN—Y—NCO (II)

where
 $R^1$, $R^2$ and $R^3$ are identical or different radicals and each is a saturated or unsaturated, linear or branched, aliphatic or cycloaliphatic radical or an optionally substituted aromatic or araliphatic radical having up to 18 carbon atoms, which may optionally contain up to 3 heteroatoms from the group of oxygen, sulfur, nitrogen,
 X is a linear or branched organic radical having at least 2 carbon atoms and
 Y is a linear or branched, aliphatic or cycloaliphatic radical having 4 to 18 carbon atoms or an optionally substituted aromatic or araliphatic radical having 6 to 18 carbon atoms.
with
B) an at least difunctional polyol having a number-average molecular weight $M_n$ of 62 to 22 000 g/mol, preferably 90 to 12 000 g/mol,
while maintaining a ratio of equivalents of isocyanate groups to hydroxyl groups of 0.7:1 to 1.2:1.

The number-average molecular weights $M_n$ of the polymeric polyols specified in the overall document are determined by means of gel permeation chromatography (GPC) as follows: Calibration is effected with polystyrene standards having molecular weights of Mp 1 000 000 to 162. The eluent used is tetrahydrofuran p.A. The following parameters are observed in the duplicate measurement: measurement at room temperature; degassing: online degasser; flow rate: 1 ml/min; analysis time: 45 minutes; detectors: refractometer and UV detector; injection volume: 100 µl-200 µl.

Mean molar mass values $M_n$ are calculated with software support. Baseline points and evaluation limits are fixed in accordance with DIN 55672 Part 1. In the case of low molecular weight polyols having defined structure, the molecular weight calculable from the empirical formula applies.

The process according to the invention is based on the surprising observation that thiourethanes having isocyanate and silane groups formed from standard mercaptoalkylsilanes and diisocyanates, unlike the above-described N-alkylaminosilanes, even at the high temperatures of a thin-film distillation, are entirely stable and can be reacted with polyols to give silane-functional polyurethanes notable for low viscosities and a low tendency to crystallize. This was surprising because it is known from U.S. Pat. No. 4,246,369, for example, that aliphatic and aromatic thiols, just like secondary amines, are blocking agents for isocyanates, which are eliminated again even at comparatively low temperatures. It was therefore unexpected that the unconverted monomers can be distilled off from the desired isocyanatosilane (1:1 mono adduct) in reaction mixtures of mercaptosilanes and molar excess amounts of diisocyanates without formation of more than the amount of 2:1 bis adduct to be expected in statistical terms on the basis of the ratio of equivalents of isocyanate groups to mercapto groups chosen for the reaction. None of the publications cited gave the person skilled in the art any hint that it is possible in spite of the known thermal lability of thiourethanes to work up reaction mixtures of diisocyanates and mercaptosilanes by distillation without breakdown, and that the isocyanatosilanes obtainable by this process can be reacted particularly advantageously with polyols to give silane-functional polyurethanes.

Constituent b) of composition A) has a proportion of ≤1% by weight, preferably ≤0.5% by weight and more preferably ≤0.3% by weight of the total mass of composition A).

In a preferred embodiment of the process according to the invention, composition A) additionally comprises compounds c) of the general formula (III) in a proportion of 2% to 15% by weight, preferably 2% to 10% by weight, based on the total mass of components a) and c),

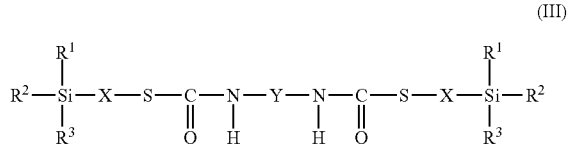

(III)

where
 $R^1$, $R^2$ and $R^3$ are identical or different radicals and each is a saturated or unsaturated, linear or branched, aliphatic or cycloaliphatic radical or an optionally substituted aromatic or araliphatic radical having up to 18 carbon atoms, which may optionally contain up to 3 heteroatoms from the group of oxygen, sulfur, nitrogen,
 X is a linear or branched organic radical having at least 2 carbon atoms and
 Y is a linear or branched, aliphatic or cycloaliphatic radical having 4 to 18 carbon atoms or an optionally substituted aromatic or araliphatic radical having 6 to 18 carbon atoms.
In a further preferred embodiment of the invention, composition A) comprises
 a) ≥85% by weight, preferably ≥90% by weight, of compounds of the general formula (I),
 b) ≤1% by weight of one or more monomeric diisocyanates having aliphatically, cycloaliphatically, araliphatically and/or aromatically bonded isocyanate groups of the general formula (II) and c) ≤15% by weight, preferably ≤10% by weight, of compounds of the general formula (III),

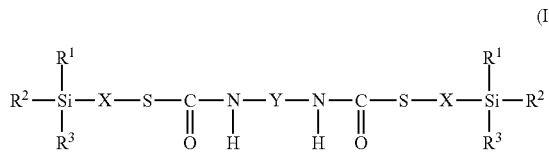

where the proportion of each of a) and c) relates to the total mass of the compounds a) and c), and the proportion of b) relates to the total mass of the composition A),
and where
$R^1$, $R^2$ and $R^3$ are identical or different radicals and each is a saturated or unsaturated, linear or branched, aliphatic or cycloaliphatic radical or an optionally substituted aromatic or araliphatic radical having up to 18 carbon atoms, which may optionally contain up to 3 heteroatoms from the group of oxygen, sulfur, nitrogen,
X is a linear or branched organic radical having at least 2 carbon atoms and
Y is a linear or branched, aliphatic or cycloaliphatic radical having 4 to 18 carbon atoms or an optionally substituted aromatic or araliphatic radical having 6 to 18 carbon atoms.

Composition A) is preferably obtained by reacting monomeric diisocyanates having aliphatically, cycloaliphatically, araliphatically and/or aromatically bonded isocyanate groups (i) with mercaptosilanes (ii) in a ratio of equivalents of isocyanate groups to mercapto groups of at least 6:1 to at most 40:1, preferably of at least 8:1 to at most 30:1 and more preferably of 10:1 to at most 25:1.

Compounds containing isocyanate and silane groups which have been prepared using a smaller excess of diisocyanate contain a very high proportion of the unwanted 2:1 bis adduct as a by-product unreactive towards polyols, and so a corresponding process is uneconomic. Even in the case of a more than 40-fold excess of diisocyanate, the process becomes uneconomic.

Starting compounds i) used for the preparation of the composition A) are preferably mercaptosilanes of the general formula (IV) or mixtures thereof

in which
$R^1$, $R^2$ and $R^3$ are identical or different radicals and each is a saturated or unsaturated, linear or branched, aliphatic or cycloaliphatic radical or an optionally substituted aromatic or araliphatic radical having up to 18 carbon atoms, which may optionally contain up to 3 heteroatoms from the group of oxygen, sulfur, nitrogen, and
X is a linear or branched organic radical having at least 2 carbon atoms.

Particularly preferred mercaptosilanes i) for the process according to the invention are those of the general formula (IV) in which
$R^1$, $R^2$ and $R^3$ are identical or different radicals and each is a saturated, linear or branched, aliphatic or cycloaliphatic radical having up to 6 carbon atoms, which may optionally contain up to 3 oxygen atoms and
X is a linear or branched alkylene radical having 2 to 10 carbon atoms.

Very particularly preferred mercaptosilanes i) are those of the general formula (IV) in which
$R^1$, $R^2$ and $R^3$ are identical or different radicals and each is an alkyl radical having up to 6 carbon atoms and/or alkoxy radical containing up to 3 oxygen atoms, with the proviso that at least one of the $R^1$, $R^2$ and $R^3$ radicals is such an alkoxy radical and
X is a propylene radical (—$CH_2$—$CH_2$—$CH_2$—).

Further very particularly preferred mercaptosilanes i) are those of the general formula (IV) in which
$R^1$, $R^2$ and $R^3$ are identical or different radicals and each is methyl, methoxy or ethoxy, with the proviso that at least one of the $R^1$, $R^2$ and $R^3$ radicals is a methoxy or ethoxy radical and
X is a propylene radical (—$CH_2$—$CH_2$—$CH_2$—), Suitable mercaptosilanes i) are, for example, 2-mercaptoethyltrimethylsilane, 2-mercaptoethylmethyldimethoxysilane, 2-mercaptoethytnrimethoxysilane, 2-mercaptoethyltriethoxysilane, 3-mercaptopropylmethyldimethoxysilane, 3-mercaptopropyldimethylmethoxysilane, 3-mercaptopropyltrimethoxysilane, 3-mercaptopropylmethyldiethoxysilane, 3-mercaptopropyltriethoxysilane, 3-mercaptopropylethyldimethoxysilane, 3-mercaptopropylethyldiethoxysilane and/or 4-mercaptobutyltrimethoxysilane.

Suitable starting compounds ii) for the composition A) are any desired diisocyanates which have aliphatically, cycloaliphatically, araliphatically and/or aromatically bonded isocyanate groups and can be prepared by any desired processes, for example by phosgenation or by a phosgene-free route, for example by urethane cleavage.

Preferred diisocyanates are, for example, those of the general formula (II)

in which Y is a linear or branched, aliphatic or cycloaliphatic radical having 4 to 18 carbon atoms or an optionally substituted aromatic or araliphatic radical having 6 to 18 carbon atoms.

Examples include 1,4-diisocyanatobutane, 1,6-diisocyanatohexane (HDI), 1,5-diisocyanato-2,2-dimethylpentane, 2,2,4- or 2,4,4-trimethyl-1,6-diisocyanatohexane, 1,10-diisocyanatodecane, 1,3- and 1,4-diisocyanatocyclohexane, 1,4-diisocyanato-3,3,5-trimethylcyclohexane, 1,3-diisocyanato-2-methylcyclohexane, 1,3-diisocyanato-4-methylcyclohexane, i-isocyanato-3,3,5-trimethyl-5-isocyanatomethylcyclohexane (isophorone diisocyanate; IPDI), 1-isocyanato-1-methyl-4(3)-isocyanatomethylcyclohexane, 2,4'- and 4,4'-diisocyanatodicyclohexylmethane ($H_{12}$-MDI), 1,3- and 1,4-bis(isocyanatomethyl)cyclohexane, 4,4'-diisocyanato-3,3'-dimethyldicyclohexylmethane, 4,4'-diisocyanato-3,3',5,5'-tetramethyldicyclohexylmethane, 4,4'-diisocyanato-1,1'-bi(cyclohexyl), 4,4'-diisocyanato-3,3'-dimethyl-1,1'-bi(cyclohexyl), 4,4'-diisocyanato-2,2',5,5'-tetramethyl-1,1'-bi(cyclohexyl), 1,8-diisocyanato-p-menthane, 1,3-diisocyanatoadamantane, 1,3-dimethyl-5,7-diisocyanatoadamantane, 1,3- and 1,4-bis(isocyanatomethyl)benzene, 1,3- and 1,4-bis(1-isocyanato-1-methylethyl)benzene (TMXDI), bis(4-(1-isocyanato-1-methylethyl)phenyl) carbonate, phenylene 1,3- and 1,4-diisocyanate, tolylene 2,4- and 2,6-diisocyanate and any desired mixtures of these isomers, diphenylmethane 2,4'- and/or 4,4'-diisocyanate and naphthylene 1,5-diisocyanate and any desired mixtures of such diisocyanates. Further diisocyanates that are likewise suitable can additionally be found, for example, in Justus Liebigs Annalen der Chemie, volume 562 (1949) p. 75-136.

Particularly preferred starting components ii) are diisocyanates of the general formula (II) in which Y is a linear or branched, aliphatic or cycloaliphatic radical having 6 to 13 carbon atoms.

Very particularly preferred starting components ii) for the process according to the invention are 1,6-diisocyanatohexane, i-isocyanato-3,3,5-trimethyl-5-isocyanatomethylcyclohexane, 2,4'- and/or 4,4'-diisocyanatodicyclohexylmethane or any desired mixtures of these diisocyanates.

For preparation of the composition A), the diisocyanates ii) are reacted with the mercaptosilanes i) at temperatures of 20 to 200° C., preferably 40 to 160° C. This is done by using components ii) and i) in a ratio of equivalents of isocyanate groups (component ii) to mercapto groups (component i) of at least 6:1 to at most 40:1, preferably of 8:1 to at most 30:1 and more preferably of 10:1 to at most 25:1.

The reaction of the starting components i) and ii) in the process according to the invention can be executed in solution or without solvent in substance, but is preferably executed without solvent.

The preparation of composition A) can be conducted without the use of catalysts. The reaction can optionally also be accelerated using customary catalysts known from polyurethane chemistry.

Examples include tertiary amines, for example triethylamine, tributylamine, dimethylbenzylamine, diethylbenzylamine, pyridine, methylpyridine, dicyclohexylmethylamine, dimethylcyclohexylamine, N,N,N',N'-tetramethyldiaminodiethyl ether, bis(dimethylaminopropyl)urea, N-methyl- or N-ethylmorpholine, N-cocomorpholine, N-cydohexylmorpholine, N,N,N',N'-tetramethylethylenediamine, N,N,N',N'-tetramethyl-1,3-butanediamine, N,N,N',N'-tetramethyl-1,6-hexanediamine, pentamethyldiethylenetriamine, N-methylpiperidine, N-dimethylaminoethylpiperidine, N,N'-dimethylpiperazine, N-methyl-N'-dimethylaminopiperazine, 1,2-dimethylimidazole, 2-methylimidazole, N,N-dimethylimidazole-β-phenylethylamine, 1,4-diazabicyclo[2.2.2]octane (DABCO) and bis(N,N-dimethylaminoethyl) adipate, amidines, for example 1,5-diazabicyclo[4.3.0]nonene (DBN), 1,8-diazabicyclo[5.4.0]undec-7-ene (DBU) and 2,3-dimethyl-3,4,5,6-tetrahydropynmidine, alkanolamine compounds, for example triethanolamine, triisopropanolamine, N-methyldiethanolamine, N-ethyldiethanolamine, dimethylaminoethanol and 2-(N,N-dimethylaminoethoxy) ethanol, N,N',N''-tris(dialkylaminoalkyl)hexahydrotriazines, for example N,N',N''-tris(dimethylaminopropyl)-s-hexahydrotriazine, bis(dimethylaminoethyl) ether and metal salts, for example inorganic and/or organic compounds of iron, lead, bismuth, zinc and/or tin in customary oxidation states of the metal, for example iron(II) chloride, iron(III) chloride, bismuth(III) 2-ethylhexanoate, bismuth(III) octoate, bismuth (III) neodecanoate, zinc chloride, zinc 2-ethylcaproate, tin(II) octoate, tin(II) ethylcaproate, tin(II) palmitate, dibutyltin(IV) dilaurate (DBTL), dibutyltin(IV) dichloride or lead octoate.

Preferred catalysts for use are tertiary amines, amidines and tin compounds of the type specified.

Particularly preferred catalysts are 1,4-diazabicyclo[2.2.2] octane (DABCO), 1,5-diazabicyclo[4.3.0]nonene (DBN), 1,8-diazabicyclo[5.4.0]undec-7-ene (DBU) and dibutyltin (IV) dilaurate (DBTL).

The catalysts mentioned by way of example can be used individually or in the form of any desired mixtures with one another in the preparation of the composition A) and are used, if at all, in amounts of 0.001% to 1.0% by weight, preferably 0.01% to 0.5% by weight, calculated as the total amount of catalysts used, based on the total amount of starting compounds used.

The progress of the reaction in the process according to the invention can be monitored by determining the NCO content by titrimetric means, for example. On attainment of the desired NCO content, generally after full urethanization, the reaction is stopped.

In a preferred embodiment, after the reaction of components A) with B), any unconverted excess of monomeric isocyanates A) is separated from the reaction product apart from a residual content of less than 1% by weight, preferably of less than 0.5% by weight, more preferably of less than 0.3% by weight, based on the total mass of the reaction product.

This is preferably done by freeing the reaction mixture of excess monomeric diisocyanates by thin-film distillation under reduced pressure, for example at a pressure of below 1.0 mbar, preferably below 0.5 mbar, more preferably below 0.2 mbar, under very gentle conditions, for example at a temperature of 100 to 200° C., preferably of 120 to 180° C.

The distillates obtained can be used without any problem for a new reaction with mercaptosilanes.

In a further, although less preferred embodiment, the monomeric diisocyanates are separated from the thiourethane formed by extraction with suitable solvents inert toward isocyanate and silane groups, for example aliphatic or cycloaliphatic hydrocarbons such as pentane, hexane, heptane, cyclopentane or cyclohexane.

Irrespective of the type of workup, the products obtained are clear, virtually colorless compounds containing isocyanate and silane groups, which, depending on the starting diisocyanate chosen, are liquids of low to high viscosity and have NCO contents of 6.0% to 13.5% by weight, preferably 7.0% to 12.0% by weight, more preferably 8.0% to 11.5% by weight, and residual contents of monomeric starting diisocyanates of less than 1.0% by weight, preferably of less than 0.5% by weight, more preferably of less than 0.3% by weight, based on the total mass of the reaction product.

As constituent b) of the composition A), it is consequently possible for all the monomeric diisocyanates i) used for preparation of the composition A) to occur. The preferred embodiments specified above for component ii) also apply to b).

For the formulae (I) and (II) of components a) and b), or for the formulae (I), (II) and (III) of components a), b) and c), it is preferable that
Y is a linear or branched, aliphatic or cycloaliphatic radical having 6 to 13 carbon atoms.

In addition, for the formula (I) of component a) or the formulae (I) and (III) of components a) and c), it is preferable that
$R^1$, $R^2$ and $R^3$ are identical or different radicals and each is a saturated, linear or branched, aliphatic or cycloaliphatic radical having up to 6 carbon atoms, which may optionally contain up to 3 oxygen atoms and
X is a linear or branched alkylene radical having 2 to 10 carbon atoms.

For the formula (I) of component a) or the formulae (I) and (III) of components a) and c), it is more preferable that
$R^1$, $R^2$ and $R^3$ are each alkyl radicals having up to 6 carbon atoms and/or alkoxy radicals containing up to 3 oxygen atoms, with the proviso that at least one of the $R^1$, $R^2$ and $R^3$ radicals is such an alkoxy radical and
X is a propylene radical (—$CH_2$—$CH_2$—$CH_2$—).

For the formula (I) of component a) or the formulae (I) and (III) of components a) and c), it is most preferable that $R^1$, $R^2$ and $R^3$ are identical or different radicals and each is methyl, methoxy or ethoxy, with the proviso that at least one of the R1, R2 and R3 radicals is a methoxy or ethoxy radical and X is a propylene radical ($-CH_2-CH_2-CH_2-$).

The polyol components B) used in the process according to the invention are any desired at least difunctional polyols having a number-average molecular weight $M_n$ of 62 to 22 000 g/mol, preferably 90 to 18 000 g/mol, more preferably 90 to 12 000 g/mol.

Preferably, the polyol components B) used in the process according to the invention have a mean functionality of 2 to 6 and more preferably a mean functionality of 2 to 4.

It is also possible to use any desired mixtures of the polyols mentioned.

In a preferred embodiment of the invention, components B) used are polyhydric alcohols, ether alcohols or ester alcohols and/or polymeric polyols, said polymeric polyols having a number-average molecular weight $M_n$ of 200 to 22 000 g/mol, preferably 250 to 18 000 g/mol.

In a specific embodiment of the process according to the invention, polyol components B) used are polyhydric alcohols and/or ether alcohols or ester alcohols containing 2 to 14 carbon atoms, preferably 4 to 10 carbon atoms.

Suitable polyols B) are, for example, simple polyhydric alcohols having 2 to 14 and preferably 4 to 10 carbon atoms, for example ethane-1,2-diol, propane-1,2- and -1,3-diol, the isomeric butanediols, pentanediols, hexanediols, heptanediols and octanediols, decane-1,10-diol, dodecane-1,12-diol, cyclohexane-1,2- and -1,4-diol, cyclohexane-1,4-dimethanol, 1,4-bis(2-hydroxyethoxy)benzene, 2,2-bis(4-hydroxyphenyl)propane (bisphenol A), 2,2-bis(4-hydroxycyclohexyl)propane (perhydrobisphenol), propane-1,2,3-triol, butane-1,2,4-triol, 1,1,1-trimethylolethane, hexane-1,2,6-triol, 1,1,1-trimethylolpropane (TMP), bis(2-hydroxyethyl)hydroquinone, 1,2,4- and 1,3,5-trihydroxycyclohexane, 1,3,5-tris(2-hydroxyethyl) isocyanurate, 3(4),8(9)-bis(hydroxymethyl)tricyclo[5.2.1.0$^{2,6}$]decane, ditrimethylolpropane, 2,2-bis(hydroxymethyl)propane-1,3-diol (pentaerythritol), 2,2,6,6-tetrakis(hydroxymethyl)-4-oxaheptane-1,7-diol (dipentaerythritol), mannitol or sorbitol, low molecular weight ether alcohols, for example diethylene glycol, triethylene glycol, tetraethylene glycol, dipropylene glycol or dibutylene glycol, or low molecular weight ester alcohols, for example neopentyl glycol hydroxypivalate.

Suitable polyols B) are also the customary polyether polyols, polyester polyols, polycarbonate polyols and/or polyacrylate polyols known from polyurethane chemistry, these typically having a number-average molecular weight of 200 to 22 000, preferably of 250 to 18 000, more preferably of 250 to 12 000. A broad overview of suitable polymeric polyols B) can be found, for example, in N. Adam et al.: "Polyurethanes", Ullmann's Encyclopedia of Industrial Chemistry, Electronic Release, 7th ed., chap. 3.2-3.4, Wiley-VCH, Weinheim 2005.

Suitable polyether polyols B) are, for example, those of the type specified in DE 26 22 951 B, column 6 line 65 to column 7 line 26, EP-A 0 978 523, page 4 line 45 to page 5 line 14, or WO 2011/069966, page 4 line 20 to page 5 line 23, provided that they meet the specifications made above in terms of functionality and molecular weight. Particularly preferred polyether polyols B) are addition products of ethylene oxide and/or propylene oxide onto propane-1,2-diol, propane-1,3-diol, glycerol, trimethylolpropane, ethylenediamine and/or pentaerythritol, or the polytetramethylene ether glycols which are obtainable by polymerizing tetrahydrofuran, for example according to Angew. Chem. 72, 927 (1960), and have number-average molecular weights of 400 g/mol to 4000 g/mol.

Suitable polyester polyols B) are, for example, those of the type specified in EP-A 0 978 523, column 5 lines 17 to 47, or EP-A 0 659 792, page 6 lines 32 to 45, provided that they meet the specifications made above in terms of functionality and molecular weight. Particularly preferred polyester polyols are condensation products of polyhydric alcohols, for example ethane-1,2-diol, propane-1,2-diol, diethylene glycol, butane-1,4-diol, hexane-1,6-diol, neopentyl glycol, cyclohexane-1,4-dimethanol, cyclohexane-1,4-diol, perhydrobisphenol, 1,1,1-trimethylolpropane, propane-1,2,3-triol, pentaerythritol and/or sorbitol, with substoichiometric amounts of polybasic carboxylic acids or carboxylic anhydrides, for example succinic acid, adipic acid, sebacic acid, dodecanedioic acid, glutaric anhydride, maleic anhydride, phthalic anhydride, isophthalic acid, terephthalic acid, trimellitic acid, hexahydrophthalic anhydride and/or tetrahydrophthalic anhydride, or those as obtainable in a manner known per se from lactones, for example ε-caprolactone, and simple monohydric alcohols, for example those mentioned above by way of example, as starter molecules with ring opening.

Suitable polycarbonate polyols B) are especially the reaction products of dihydric alcohols known per se, for example those as mentioned by way of example above in the list of polyhydric alcohols, with diaryl carbonates, for example diphenyl carbonate, dimethyl carbonate or phosgene. Suitable polycarbonate polyols B) are also those which additionally contain ester groups as well as carbonate structures. These are especially the polyester carbonate diols known per se, as obtainable, for example, according to the teaching of DE-B 1 770 245 through reaction of dihydric alcohols with lactones, such as ε-caprolactone in particular, and subsequent reaction of the polyester diols formed with diphenyl carbonate or dimethyl carbonate. Likewise suitable polycarbonate polyols B) are those which additionally contain ether groups as well as carbonate structures. These are especially the polyether carbonate polyols known per se, as obtainable, for example, by the process of EP-A 2046861 through catalytic reaction of alkylene oxides (epoxides) and carbon dioxide in the presence of H-functional starter substances.

Suitable polyacrylate polyols B) are, for example, those of the type specified in WO 2011/124710, page 10 line 32 to page 13 line 18, provided that they meet the specifications made above in terms of functionality and molecular weight. Particularly preferred polyacrylate polyols B) are polymers or copolymers of hydroxyalkyl esters of acrylic acid or methacrylic acid, for example hydroxyethyl (meth)acrylate, hydroxypropyl (meth)acrylate or hydroxybutyl (meth)acrylate, optionally together with alkyl acrylates and/or alkyl methacrylates, for example methyl (meth)acrylate, ethyl (meth)acrylate, n-butyl (meth)acrylate, isobutyl (meth)acrylate, 2-ethylhexyl (meth)acrylate, cyclohexyl (meth)acrylate, isobornyl (meth)acrylate, lauryl (meth)acrylate, styrene or other copolymerizable olefinically unsaturated monomers, for example acrylic acid, methacrylic acid or dimethyl maleate.

Suitable polyols B) are, for example, also the known polyacetal polyols obtainable through reaction of simple glycols, for example diethylene glycol, triethylene glycol, 4,4'-dioxyethoxydiphenyldimethylmethane (adduct of 2 mol of ethylene oxide onto bisphenol A) or hexanediol, with formaldehyde, or else polyacetals prepared through polycondensation of cyclic acetals, for example trioxane.

Further suitable polyols B) are, for example, also those described in EP-A 0 689 556 and EP-A 0 937 110, for example specific polyols obtainable through reaction of epoxidized fatty acid esters with aliphatic or aromatic polyols, opening the epoxide ring.

Polybutadienes containing hydroxyl groups can likewise serve as polyols B).

In a preferred embodiment of the invention, components B) used are polyether polyols, polyester polyols, polycarbonate polyols and/or polyacrylate polyols.

The polyols B) can be used individually or in the form of any desired mixtures in the process according to the invention. They may either be in solvent-free form or dissolved in customary solvents.

Suitable solvents are especially those which are inert toward the reactive groups of the thiourethanes A), for example the known customary aprotic varnish solvents, for example ethyl acetate, butyl acetate, ethylene glycol monomethyl ether acetate or monoethyl ether acetate, 1-methoxyprop-2-yl acetate, 3-methoxy-n-butyl acetate, acetone, 2-butanone, 4-butyl-2-pentanone, cyclohexanone, toluene, xylene, chlorobenzene, petroleum spirit, aromatics having a relatively high degree of substitution, as commercially available, for example, under the Solvent naphtha, Solvesso®, Isopar), Nappar® (Deutsche EXXON CHEMICAL GmbH, Cologne, DE) and Shellsol® (Deutsche Shell Chemie GmbH, Eschborn, DE) names, but also solvents such as propylene glycol diacetate, diethylene glycol dimethyl ether, dipropylene glycol dimethyl ether, diethylene glycol ethyl and butyl ether acetate, ethyl ethoxypropionate, propylene carbonate, N-methylpyrrolidone and N-methylcaprolactam, or any desired mixtures of such solvents.

For performance of the process according to the invention, the isocyanate- and silane-functional thiourethanes A) are reacted with at least one polyol B) in any sequence at temperatures of 20 to 200° C., preferably of 40 to 160° C., more preferably of 60 to 120° C., optionally in the presence of at least one of the aforementioned aprotic solvents, to give polyurethanes containing silane groups. In this reaction, a ratio of equivalents of isocyanate groups to hydroxyl groups of 0.7:1 to 1.2:1, preferably of 0.8:1 to 1.1:1, more preferably of 0.9:1 to 1.05:1, is observed.

The process according to the invention can be conducted without catalysis. The urethanization reaction can optionally also be accelerated using catalysts customary in isocyanate chemistry. Suitable urethanization catalysts are, for example, the compounds already described above as suitable for preparation of the composition A). These catalysts can be used individually or in the form of any desired mixtures with one another in the process according to the invention and are used, if at all, in amounts of 0.001% to 1.0% by weight, preferably 0.01% to 0.5% by weight, calculated as the total amount of catalysts used, based on the total amount of the co-reactants A) and B).

In order to prevent premature crosslinking of the silane groups during the process according to the invention, it may be advantageous to add water scavengers, for example orthoformic esters, for example triethyl orthoformate, or vinylsilanes, for example vinyltrimethoxysilane. These water scavengers are used, if at all, in amounts of up to 5% by weight, preferably up to 2% by weight, based on the total amount of the co-reactants A) and B).

In a preferred embodiment of the process according to the invention, the composition A) is optionally initially charged under inert gas, for example nitrogen, and optionally in the presence of a suitable solvent of the type specified, at a temperature between 20 and 100° C. Subsequently, a polyol B) or a mixture of polyols B), optionally together with other solvent, is added successively in any sequence or in a mixture in the ratio of equivalents specified above, and the reaction temperature for the urethanization, if necessary, is set to a temperature of 40 to 160° C. through a suitable measure (heating or cooling). When catalysts and/or water scavengers are used, they can be added to the composition A) and/or to the polyol component B) prior to commencement of the actual reaction. However, it is also possible to add these auxiliaries to the reaction mixture at any time during the urethanization reaction. To remove residual moisture in the polyol component B), any water scavengers to be used are added thereto, preferably prior to commencement of the actual reaction.

The progress of the reaction in the process according to the invention can be monitored by determining the NCO content by titrimetric means, for example, or by IR spectroscopy. After the urethanization reaction, i.e. after full conversion of isocyanate and hydroxyl groups, products obtained from the process according to the invention are the inventive polyurethanes containing silane groups.

The invention further provides polyurethanes containing silane groups, obtainable by the process according to the invention.

The inventive polyurethanes containing silane groups are valuable binders for production of raw materials for varnishes, sealants or adhesives which are crosslinkable via silane structures.

The invention further provides for the use of the inventive polyurethanes containing silane groups as a starting component in the production of crosslinkable binders or of raw materials for varnishes, sealants or adhesives, and also the crosslinkable binders comprising the inventive polyurethanes containing silane groups.

The inventive polyurethanes containing silane groups can be used preferentially as binders for production of raw materials of varnishes, sealants or adhesives in solvent-free form, but if required can also be diluted with customary solvents, for example the abovementioned inert varnish solvents for optional use in the process according to the invention, without causing turbidity.

While the process products of the invention based on simple alcohols and/or branched polyols, especially based on polyester polyols and/or polyacrylate polyols, are preferably suitable for conventional varnish applications, those based on high molecular weight linear polyether diols are especially used for applications in the sealants or adhesives sector.

The inventive polyurethanes containing silane groups can be cured either by moisture crosslinking in the manner of a sol-gel reaction or by thermal means, for example in the absence of moisture as well.

It is possible here to use catalysts which accelerate the hydrolysis and condensation of alkoxysilane groups or thermally induced condensation. Catalysts of this kind are, as well as the aforementioned urethanization catalysts, for example, acids, for example sulfuric acid, p-toluenesulfonic acid, trifluoromethanesulfonic acid, acetic acid, trifluoroacetic acid and dibutyl phosphate, bases, for example N-substituted amidines such as 1,5-diazabicyclo[4.3.0]non-5-ene (DBN) and 1,5-diazabicyclo[5.4.0]undec-7-ene (DBU), but also metal salts and chelates, for example tetraisopropyl titanate, tetrabutyl titanate, titanium(IV) acetylacetonate, aluminum tri-sec-butoxide, aluminum acetylacetonate, aluminum triflate or tin triflate, as also described by way of example in WO 2006/042658, page 11 line 23 to page 12 line 11, for example.

These catalysts are used, if at all, in amounts of up to 5% by weight, preferably up to 2% by weight, based on the weight of the polyurethanes containing silane groups used as binder Depending on the type and amount of the catalyst used, the coating compositions, sealants or adhesives formulated from the inventive process products can be cured over a wide temperature range, for example from −20 to 200° C., preferably from 0 to 180° C., more preferably from 20 to 160° C.

Optionally, the coating systems, sealants or adhesives formulated with the inventive polyurethanes containing silane groups may also be supplemented with any desired further hydrolyzable silane compounds, for example tetramethoxysilane, tetraethoxysilane, methyltrimethoxysilane, methyltriethoxysilane, ethyltriethoxysilane, isobutyltrimethoxysilane, isobutyltriethoxysilane, octyltriethoxysilane, octyltrimethoxysilane, (3-glycidyloxypropyl)methyldiethoxysilane, (3-glycidyloxypropyl)trimethoxysilane, phenyltrimethoxysilane, phenyltriethoxysilan or silane-functional copolymers of the type specified in U.S. Pat. No. 4,499,150, or mixtures of such silane compounds, as co-reactants.

In the case of formulation of varnishes, sealants or adhesives, the inventive polyurethanes containing silane groups can also be supplemented with any desired further customary auxiliaries and additives, for example UV stabilizers, antioxidants, water scavengers, slip additives, defoamers, leveling agents, rheology additives, flame retardants, fillers and/or pigments.

In addition to use as sole binders, the inventive process products can also be added, for example as an additive, to standard 1-part or 2-part polyurethane systems, for example in order to achieve very specific properties, for example for improvement of adhesion.

The coatings, sealants or adhesives formulated using the inventive polyurethanes containing silane groups can be applied by methods known per se, for example by spraying, painting, dipping, flow-coating, or with the aid of rollers or film coaters, in one or more layers. Possible substrates are any desired substrates, for example metal, wood, glass, stone, ceramic materials, concrete, hard and flexible plastics, textiles, leather and paper, which may optionally also be provided with customary primers prior to coating.

EXAMPLES

All percentages are based on weight, unless stated otherwise.

The NCO contents were determined by titrimetric means to DIN EN ISO 11909.

OH numbers were determined by titrimetric means to DIN 53240-2: 2007-11, acid numbers to DIN 3682. The OH contents reported were calculated from the OH numbers determined by analysis.

The residual monomer contents were measured to DIN EN ISO 10283 by gas chromatography with an internal standard.

The proportions of bis adduct (formed from two molecules of mercaptosilane and one molecule of diisocyanate) were determined by gel permeation chromatography based on DIN 55672-1 (Gel permeation chromatography (GPC)—Part 1: Tetrahydrofuran (THF) as elution solvent), with the alteration that a flow rate of 0.6 ml/min rather than 1.0 ml/min was employed. The proportions of bis adduct in area % taken from the chromatograms, which were determined with software support, were each equated approximately to proportions in % by weight and reported as such, based on the total amount of mono adduct and bis adduct.

All the viscosity measurements were made with a Physica MCR 51 rheometer from Anton Paar Germany GmbH (DE) to DIN EN ISO 3219.

Starting Materials
Preparation of the Compositions A)
Composition A1)

1680 g (10 mol) of hexamethylene diisocyanate (HDI) were admixed at a temperature of 80° C. under dry nitrogen with 196 g (1.0 mol) of mercaptopropyltrimethoxysilane and, after addition of 0.05 g (25 ppm) of 1,4-diazabicyclo[2.2.2]octane (DABCO), the mixture was stirred for 1 hour until an NCO content of 42.5%, corresponding to a full conversion, had been attained. Subsequently, the unconverted monomeric HDI was removed on a thin-film evaporator at a temperature of 140° C. and a pressure of 0.1 mbar. This gave a virtually colorless, clear isocyanatosilane having the following characteristic data:

NCO content: 11.2%
Monomeric HDI: 0.19%
Viscosity (23'C): 80 mPas
Proportion of bis adduct: 4.1%
Composition A2)

2220 g (10 mol) of isophorone diisocyanate (IPDI) were admixed under dry nitrogen at a temperature of 80° C. with 196 g (1.0 mol) of mercaptopropyltrimethoxysilane and, after addition of 0.06 g (25 ppm) of dibutyltin dilaurate (DBTL), the mixture was stirred for 3 hours until an NCO content of 33.0%, corresponding to a full conversion, had been attained. Subsequently, the unconverted monomeric IPDI was removed on a thin-film evaporator at a temperature of 150° C. and a pressure of 0.1 mbar. This gave a virtually colorless, clear isocyanatosilane having the following characteristic data:

NCO content: 9.7%
Monomeric IPDI: 0.23%
Viscosity (23° C.): 5400 mPas
Proportion of bis adduct: 4.8%
Composition A3)

By the process described for composition Az), 2620 g (10 mol) of 4,4'-diisocyanatodicyclohexylmethane ($H_{12}$-MDI) were reacted with 196 g (1.0 mol) of mercaptopropyltrimethoxysilane in the presence of 0.07 g (25 ppm) of DBTL. On attainment of an NCO content of 28.3%, corresponding to a full conversion, the unconverted monomeric $H_{12}$-MDI was removed on a thin-film evaporator at a temperature of 150° C. and a pressure of 0.1 mbar. This gave a virtually colorless, clear isocyanatosilane having the following characteristic data:

NCO content: 8.6%
Monomeric H12-MDI: 0.20%
Viscosity (23° C.): 15 200 mPas
Proportion of bis adduct: 6.0%
Composition A4) (Comparison)

168 g (1.0 mol) of hexamethylene diisocyanate (HDI) were admixed under dry nitrogen at a temperature of 80° C. with 196 g (1.0 mol) of mercaptopropyltrimethoxysilane and, after addition of 0.05 g (25 ppm) of DBTL, the mixture was stirred for 3 hours until an NCO content of 11.5%, corresponding to a full conversion, had been attained. This gave a virtually colorless, clear silane-modified isocyanate mixture having the following characteristic data:

NCO content: 11.5%
Monomeric HDI: 5.69%
Viscosity (23° C.): 80 mPas
Proportion of bis adduct: 38.9%

Polyols B

Polyol B1)

Polyacrylate polyol dissolved in a concentration of 60% in Solvent naphtha 100, prepared from 23.2% hydroxypropyl methacrylate, 29.6% n-butyl acrylate, 44.7% styrene, 1.9% methyl methacrylate and 0.6% acrylic acid.
OH number (OH content) 53 mg KOH/g (1.6%)
Equivalent weight: 1062 g/eq OH
Acid number 4.0 mg KOH/g
Viscosity (23° C.): 2800 mPas Polyol B2)

Polyacrylate polyol dissolved in a concentration of 70% in butyl acetate, prepared from 34.0% hydroxyethyl methacrylate, 25.1% n-butyl acrylate, 40.0% styrene and 0.9% acrylic acid.
OH number (OH content) 98 mg KOH/g (3.0%)
Equivalent weight: 572 g/eq OH
Acid number 7.5 mg KOH/g
Viscosity (23° C.): 3500 mPas Polyol B3

Solvent-free polyester polyol, prepared from 11.9% adipic acid, 33.7% isophthalic acid, 10.7% trimethylolpropane, 37.7% hexane-1,6-diol and 6.0% phthalic anhydride.
OH number (OH content) 143 mg KOH/g (4.3%)
Equivalent weight: 392 g/eq OH
Acid number 1 mg KOH/g
Viscosity (23° C.): 3500 mPas Polyol B4)

Polyester polyol dissolved in a concentration of 75% in Solvent naphtha 100, prepared from 19.2% adipic acid, 22.3% maleic anhydride, 4.6% trimethylolpropane, 1.7% propane-1,2-diol and 40.2% neopentyl glycol.
OH number (OH content) 68 mg KOH/g (2.0%)
Equivalent weight: 825 g/eq OH
Acid number. 3 mg KOH/g
Viscosity (23° C.): 3700 mPas Polyol B5)

Solvent-free linear polypropylene oxide polyether diol
OH number (OH content) 13 mg KOH/g (0.4%)
Equivalent weight: 4250 g/eq OH
Viscosity (25° C.): 2850 mPas Example 1 (inventive)

375.0 g (1.0 eq) of composition A1) were admixed at a temperature of 80° C. under dry nitrogen with 73.1 g (1.0 eq) of 2-ethyl-1,3-hexanediol, and the mixture was stirred until no isocyanate was detectable any longer by IR spectroscopy. This gave an inventive polyurethane containing silane groups in the form of a viscous colorless resin.
Solids content: 100%
Viscosity (23° C.): 44 000 mPas Example 2 (inventive)

375.0 g (1.0 eq) of composition A1) were admixed at a temperature of 80° C. under dry nitrogen with a mixture of 58.5 g (0.8 eq) of 2-ethyl-1,3-hexanediol, 212.1 g (0.2 eq) of polyol B1) and 6.5 g of triethyl orthoformate as water scavenger, and the mixture was stirred for 20 hours until no isocyanate was detectable any longer by IR spectroscopy. After cooling to room temperature, the reaction mixture was diluted with 65.2 g of Solvent naphtha 100. This gave an inventive polyurethane containing silane groups in the form of a colorless solution.
Solids content: 70%
Viscosity (23° C.): 2100 mPas Example 3 (inventive)

375.0 g (1.0 eq) of composition A1) were admixed at a temperature of 80° C. under dry nitrogen with a mixture of 43.9 g (0.6 eq) of 2-ethyl-1,3-hexanediol, 226.3 g (0.4 eq) of polyol B2) and 5.8 g of triethyl orthoformate as water scavenger, and the mixture was stirred for 20 hours until no isocyanate was detectable any longer by IR spectroscopy. After cooling to room temperature, the reaction mixture was diluted with 182.0 g of butyl acetate. This gave an inventive polyurethane containing silane groups in the form of a colorless solution.
Solids content: 70%
Viscosity (23° C.): 720 mPas Example 4 (inventive)

375.0 g (1.0 eq) of composition A1) were admixed at a temperature of 80° C. under dry nitrogen with a mixture of 58.5 g (0.8 eq) of 2-ethyl-1,3-hexanediol, 78.9 g (0.2 eq) of polyol B3), 5.1 g of triethyl orthoformate as water scavenger and 0.02 g of dibutyltin dilaurate (DBTL) as catalyst, and the mixture was stirred for 22 hours until no isocyanate was detectable any longer by IR spectroscopy. After cooling to room temperature, the reaction mixture was diluted with 129.4 g of butyl acetate. This gave an inventive polyurethane containing silane groups in the form of a colorless solution.
Solids content: 80%
Viscosity (23° C.): 880 mPas Example 5 (inventive)

375.0 g (1.0 eq) of composition A1) were admixed at a temperature of 80° C. under dry nitrogen with a mixture of 43.9 g (0.6 eq) of 2-ethyl-1,3-hexanediol, 339.3 g (0.4 eq) of polyol B4), 7.6 g of triethyl orthoformate as water scavenger and 0.04 g of DBTL as catalyst, and the mixture was stirred for 24 hours until no isocyanate was detectable any longer by IR spectroscopy. After cooling to room temperature, the reaction mixture was diluted with 106.7 g of Solvent naphtha 100. This gave an inventive polyurethane containing silane groups in the form of a colorless solution.
Solids content: 80%
Viscosity (23° C.): 8400 mPas Example 6 (inventive)

262.5 g (0.7 eq) of composition A1) and 129.9 g (0.3 eq) of the isocyanate- and silane-functional thiourethane A2) were admixed at a temperature of 80° C. under dry nitrogen with a mixture of 65.8 g (0.9 eq) of 2-ethyl-1,3-hexanediol, 106.1 g (0.1 eq) of polyol B1), 5.6 g of triethyl orthoformate as water scavenger and 0.03 g of DBTL as catalyst, and the mixture was stirred for 22 hours until no isocyanate was detectable any longer by IR spectroscopy. After cooling to room temperature, the reaction mixture was diluted with 100.1 g of Solvent naphtha 100. This gave an inventive polyurethane containing silane groups in the form of a colorless solution.
Solids content: 80%
Viscosity (23° C.): 1190 mPas Example 7 (inventive)

300.0 g (0.7 eq) of composition A1) and 97.7 g (0.2 eq) of the isocyanate- and silane-functional thiourethane A3) were admixed at a temperature of 80° C. under dry nitrogen with a mixture of 65.8 g (0.9 eq) of 2-ethyl-1,3-hexanediol, 106.1 g (0.1 eq) of polyol B1), 5.7 g of triethyl orthoformate as water scavenger and 0.03 g of DBTL as catalyst, and the mixture was stirred for 22 hours until no isocyanate was detectable any longer by IR spectroscopy. After cooling to room temperature, the reaction mixture was diluted with 90.8 g of Solvent naphtha 100. This gave an inventive polyurethane containing silane groups in the form of a colorless solution.
Solids content: 80%
Viscosity (23° C.): 2480 mPas Example 8 (inventive)

375.0 g (1.0 eq) of composition A1) were admixed at a temperature of 80° C. under dry nitrogen with 4250 g (1.0 eq) of polyol B5), 9.2 g of vinyltrimethoxysilane as water scavenger and 0.2 g of DBTL as catalyst, and the mixture was stirred until no isocyanate was detectable any longer by IR spectroscopy. This gave an inventive polyurethane containing silane groups in the form of a viscous colorless resin.
Solids content: 100%
Viscosity (23° C.): 48 000 mPas Example 9 (comparative)

365.2 g (1.0 eq) of composition A4) were admixed at a temperature of 80° C. under dry nitrogen with a mixture of 58.5 g (0.8 eq) of 2-ethyl-1,3-hexanediol, 212.1 g (0.2 eq) of polyol B1) and 6.5 g of triethyl orthoformate as water scavenger, and the mixture was stirred. After about 1 hour, there was a distinct rise in the viscosity of the reaction mixture. After three hours, the reaction mixture had gelated completely.

The example shows that thiourethanes obtained by equimolar reaction of a diisocyanate with a mercaptosilane without subsequent thin-film distillation are unsuitable for preparation of polyurethanes containing silane groups because of the very high monomer content, which leads to chain extension and crosslinking.

Examples 10-16 (use, inventive)

The inventive polyurethanes 1) to 7) containing silane groups were used to formulate varnishes together with the auxiliaries and additives listed in table 1, and each was adjusted to a solids content of 50%. The varnishes were applied to glass panes in a wet film thickness of about 80 μm, flashed off at room temperature for 15 minutes and dried at 140° C. for 30 min. In all cases, high-gloss transparent varnish films were obtained. Table 1 below shows the compositions of the varnish formulations (parts by weight in each case) and varnish properties of the resultant coatings.

Resistance to dry scratching was tested by means of a hammer test. This was done by cautiously placing a hammer (weight: 800 g without the shaft) with its flat side covered with 00 steel wool onto the coated surface at right angles, and running it over the coating in one trace, without tilting and without applying additional physical strength. 10 back-and-forth strokes were conducted in each case. After the test surface had been stressed with the scratching medium, it was wiped with a soft cloth and then the gloss (angle 20°) was measured transverse to the scratching direction to DIN EN ISO 2813.

The figures for wet and dry scratching are expressed in % residual gloss, measured directly after scratching (first value) and after "reflow" conditions, i.e. storage at 60° C. for two hours (second value), each relative to the starting gloss of the coating.

Examples 17-18 (use, inventive)

The polyurethanes containing silane groups from example 3 and example 4 were each admixed with 0.5% of a 10% solution of p-toluenesulfonic acid monohydrate in MPA as catalyst and applied to glass panes in a wet film thickness of about 80 μm. After 1 hour, the two high-gloss transparent varnish films were each tack-free. Table 2 below shows, as well as the compositions of the varnishes (parts by weight in each case), the pendulum hardnesses and solvent resistances measured after room temperature drying for one day and for one week.

TABLE 2

| | Example | |
|---|---|---|
| | 17 | 18 |
| Polyurethane containing silane groups from example 2 | 100.0 | — |
| Polyurethane containing silane groups from example 3 | — | 100.0 |
| p-toluenesulfonic acid monohydrate (10% in MPA) | 0.5 | 0.5 |
| Appearance of film | OK | OK |

TABLE 1

| | | Example | | | | | | |
|---|---|---|---|---|---|---|---|---|
| | | 10 | 11 | 12 | 13 | 14 | 15 | 16 |
| Polyurethane containing silane groups from example 1 | | 100.0 | — | — | — | — | — | — |
| Polyurethane containing silane groups from example 2 | | — | 100.0 | — | — | — | — | — |
| Polyurethane containing silane groups from example 3 | | — | — | 100.0 | — | — | — | — |
| Polyurethane containing silane groups from example 4 | | — | — | — | 100.0 | — | — | — |
| Polyurethane containing silane groups from example 5 | | — | — | — | — | 100.0 | — | — |
| Polyurethane containing silane groups from example 6 | | — | — | — | — | — | 100.0 | — |
| Polyurethane containing silane groups from example 7 | | — | — | — | — | — | — | 100.0 |
| Baysilon ® OL 17 (10% in MPA) [1] | | 0.5 | 0.5 | 0.5 | 0.5 | 0.5 | 0.5 | 0.5 |
| Modaflow ® Resin (1% in MPA) [2] | | 0.5 | 0.5 | 0.5 | 0.5 | 0.5 | 0.5 | 0.5 |
| K-Kat ® 5218 (65% form as supplied) [3] | | 3.1 | 3.1 | 3.1 | 3.1 | 3.1 | 3.1 | 3.1 |
| Solvent Naphtha 100 | | — | 40.0 | — | — | 60.0 | 60.0 | 60.0 |
| Butyl acetate | | 100.0 | — | 40.0 | 60.0 | — | — | — |
| Appearance of film | | OK | OK | OK | OK | OK | OK | OK |
| Layer thickness (μm) | | 30 | 40 | 45 | 40 | 50 | 35 | 40 |
| Pendulum hardness (s) [4] | | 107 | 135 | 158 | 97 | 151 | 207 | 198 |
| Solvent resistance [5] (X/MPA/EA/Ac) | 1 min | 0013 | 0013 | 0012 | 0012 | 0012 | 0012 | 0002 |
| | 5 | 0023 | 0023 | 0022 | 0023 | 0122 | 0023 | 0022 |
| Scratch resistance [6] | wet scratch | 84/86 | 80/80 | 73/74 | 80/82 | 80/80 | 75/76 | 70/73 |
| | dry scratch | 76/90 | 80/90 | 78/87 | 82/94 | 80/92 | 78/87 | 70/85 |

[1] leveling additive (OMG Borchers GmbH, Langenfeld, Germany)
[2] leveling additive (Cytec Surface Specialties SA/NV, Brussels, Belgium)
[3] aluminum chelate, catalyst (King Industries, Inc, Norwalk, CT, USA)
[4] König pendulum hardness (DIN 53157)
[5] Resistance of the cured varnish film to xylene (X), 1-methoxy-2-propyl acetate (MPA), ethyl acetate (EA) and acetone (Ac) after a contact time of 1 min or 5 min. Rating: 0-5 (0 = varnish film unchanged; 1 = visible change; 2 = perceptible softening; 3 = significant softening; 4 = softened through to the substrate; 5 = completely destroyed without any outside influence)
[6] Resistance of coatings to wet scratching was determined with the aid of a laboratory wash system from Amtec-Kistler to DIN EN ISO 20566.

TABLE 2-continued

|  | Example | |
| --- | --- | --- |
|  | 17 | 18 |
| Layer thickness (μm) | 45 | 50 |
| after 1 d: |  |  |
| Pendulum hardness (s) [4] | 40 | 47 |
| Solvent resistance [5] (X/MPA/EA/Ac) 1 min | 0022 | 0022 |
| after 7 d: |  |  |
| Pendulum hardness (s) [4] | 73 | 97 |
| Solvent resistance [5] (X/MPA/EA/Ac) 1 min | 0022 | 0012 |

[4], [5] see notes for table 1

The invention claimed is:

1. A process for preparing polyurethanes containing silane groups, comprising reacting at least A) a composition containing a) a compound of the general formula (I) containing one or more isocyanate and silane groups

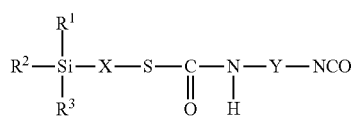
(I)

and b) ≤1% by weight, based on the total mass of composition A), of one or more monomeric diisocyanate having aliphatically, cycloaliphatically, aralphatically and/or aromatically bonded isocyanate groups of the general formula (II)

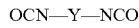
OCN—Y—NCO      (II)

where $R^1$, $R^2$ and $R^3$ are identical or different radicals and each is a saturated or unsaturated, linear or branched, aliphatic or cycloaliphatic radical or an optionally substituted aromatic or araliphatic radical having up to 18 carbon atoms, which may optionally contain up to 3 heteroatoms from the group of oxygen, sulfur, nitrogen, X is a linear or branched organic radical having at least 2 carbon atoms and Y is a linear or branched, aliphatic or cycloaliphatic radical having 4 to 18 carbon atoms or an optionally substituted aromatic or araliphatic radical having 6 to 18 carbon atoms, with B) an at least difunctional polyol having a number-average molecular weight $M_n$ of 62 to 22 000 g/mol, preferably 90 to 12 000 g/mol, while maintaining a ratio of equivalents of isocyanate groups to hydroxyl groups of 0.7:1 to 1.2:1.

2. The process for preparing polyurethanes containing silane groups as claimed in claim 1, wherein composition A) additionally comprises compounds c) of the general formula (III) in a proportion of 2% to 15% by weight, based on the total mass of components a) and c),

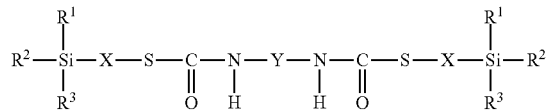
(III)

where $R^1$, $R^2$ and $R^3$ are identical or different radicals and each is a saturated or unsaturated, linear or branched, aliphatic or cycloaliphatic radical or an optionally substituted aromatic or araliphatic radical having up to 18 carbon atoms, which may optionally contain up to 3 heteroatoms from the group of oxygen, sulfur, nitrogen, X is a linear or branched organic radical having at least 2 carbon atoms and Y is a linear or branched, aliphatic or cycloaliphatic radical having 4 to 18 carbon atoms or an optionally substituted aromatic or araliphatic radical having 6 to 18 carbon atoms.

3. The process as claimed in claim 2, wherein composition A) comprises a) ≥85% by weight of compounds of the general formula (I), b) ≤1% by weight of one or more monomeric diisocyanate having aliphatically, cycloaliphatically, araliphatically and/or aromatically bonded isocyanate groups of the general formula (II) and c) ≤15% by weight of compounds of the general formula (III),

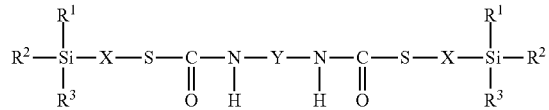
(III)

where the proportion of each of a) and c) relates to the total mass of the compounds a) and c), and the proportion of b) relates to the total mass of composition A), and where $R^1$, $R^2$ and $R^3$ are identical or different radicals and each is a saturated or unsaturated, linear or branched, aliphatic or cycloaliphatic radical or an optionally substituted aromatic or araliphatic radical having up to 18 carbon atoms, which may optionally contain up to 3 heteroatoms from the group of oxygen, sulfur, nitrogen, X is a linear or branched organic radical having at least 2 carbon atoms and Y is a linear or branched, aliphatic or cycloaliphatic radical having 4 to 18 carbon atoms or an optionally substituted aromatic or araliphatic radical having 6 to 18 carbon atoms.

4. The process as claimed in claim 1, wherein, for the formulae (I) and (II) of components a) and b), or for the formulae (I), (II) and (III) of components a), b) and c), Y is a linear or branched, aliphatic or cycloaliphatic radical having 6 to 13 carbon atoms.

5. The process as claimed in claim 1, wherein, for the formula (I) of component a) or the formulae (I) and (III) of components a) and c), $R^1$, $R^2$ and $R^3$ are identical or different radicals and each is a saturated, linear or branched, aliphatic or cycloaliphatic radical having up to 6 carbon atoms, which may optionally contain up to 3 oxygen atoms and X is a linear or branched alkylene radical having 2 to 10 carbon atoms.

6. The process as claimed in claim 1, wherein, for the formula (I) of component a) or the formulae (I) and (III) of components a) and c), $R^1$, $R^2$ and $R^3$ are identical or different radicals and each is an alkyl radical having up to 6 carbon atoms and/or alkoxy radical containing up to 3 oxygen atoms, with the proviso that at least one of the $R^1$, $R^2$ and $R^3$ radicals is such an alkoxy radical and X is a propylene radical ($-CH_2-CH_2-CH_2-$).

7. The process as claimed in claim 1, wherein, for the formula (I) of component a) or the formulae (I) and (III) of components a) and c), $R^1$, $R^2$ and $R^3$ are identical or different radicals and each is methyl, methoxy or ethoxy, with the proviso that at least one of the R1, R2 and R3 radicals is a methoxy or ethoxy radical and X is a propylene radical ($-CH_2-CH_2-CH_2-$).

8. The process as claimed in claim 1, wherein the polyol component B) has a mean functionality of 2 to 6, preferably of 2 to 4.

9. The process as claimed in claim 1, wherein component B) is a polyhydric alcohol, an ether alcohol or an ester alcohol and/or a polymeric polyol, said polymeric polyol having a number-average molecular weight $M_n$ of 200 to 22 000 g/mol.

10. The process as claimed in claim 9, wherein component B) is a polyhydric alcohol and/or an ether alcohol or an ester alcohols containing 2 to 14 carbon atoms.

11. The process as claimed in claim 10, wherein component B) is a polyether polyol, a polyester polyol, a polycarbonate polyol and/or a polyacrylate polyol.

12. A polyurethanes containing a silane group, obtained by the process as claimed in claim 1.

13. A method for the production of a crosslinkable binder comprising utilizing the polyurethane as claimed in claim 12 as a starting component.

14. A method the production of crosslinkable raw materials for paints, sealants or adhesives comprising utilizing the polyurethane as claimed in claim 12 as a starting component.

15. A crosslinkable binder comprising the polyurethane as claimed in claim 12.

* * * * *